(12) United States Patent
Romero Magariño (10) Patent No.: US 6,438,804 B1
(45) Date of Patent: Aug. 27, 2002

(54) METALLO-PLASTIC CLIP FOR ATTACHING VEHICLE ROOFS AND ACCESSORIES TO THE BODY OF A VEHICLE

(75) Inventor: Antonio Romero Magariño, Burgos (ES)

(73) Assignee: Grupo Antolin-Ingenieria, S.A., Burgos (ES)

( * ) Notice: Subject to any disclaimer, the term of this patent is extended or adjusted under 35 U.S.C. 154(b) by 0 days.

(21) Appl. No.: 09/989,872

(22) Filed: Nov. 21, 2001

Related U.S. Application Data (63) Continuation of application No. PCT/ES00/00106, filed on Mar. 24, 2000.

(51) Int. Cl.[7] .......................... A44B 17/00; F16B 5/06; F16B 19/00
(52) U.S. Cl. .......................... 24/289; 24/293; 24/297; 24/292; 411/508
(58) Field of Search .................. 24/289, 293, 297, 24/295, 292; 411/508, 510, 913

(56) References Cited

U.S. PATENT DOCUMENTS

| | | | | |
|---|---|---|---|---|
| 4,402,118 A | * | 9/1983 | Benedetti | 24/289 |
| 4,865,505 A | * | 9/1989 | Okada | 411/508 |
| 5,186,517 A | | 2/1993 | Gilmore et al. | 296/214 |
| 5,533,237 A | | 7/1996 | Higgins | 24/289 |
| 5,542,158 A | * | 8/1996 | Gronau et al. | 24/295 |
| 6,119,316 A | * | 9/2000 | Ishihara et al. | 24/297 |
| 6,141,837 A | * | 11/2000 | Wisniewski | 24/295 |
| 6,353,981 B1 | * | 3/2002 | Smith | 24/295 |

FOREIGN PATENT DOCUMENTS

| | | | |
|---|---|---|---|
| EP | 0 696 530 A1 | 2/1996 | B60R/21/20 |
| EP | 0 743 461 A1 | 11/1996 | F16B/5/06 |
| GB | 1030796 | * 5/1966 | 24/295 |
| JP | 0187632 | * 8/1987 | 24/295 |
| WO | WO 98/48179 | 10/1998 | F16B/5/06 |
| WO | WO 99/04996 | 2/1999 | B60J/3/02 |

* cited by examiner

Primary Examiner—Victor Sakran
(74) Attorney, Agent, or Firm—Baker Botts LLP (57) ABSTRACT

The metallo-plastic clip comprises a clip and a plastic shank of which is part the corresponding accessory to be placed in an opening provided on the vehicle body, with an interposed vechicle roof. The clip provided with flexible flaps with a bend after which there is a horizontal segment of maximum size with a notch for attaching the clip to the opening of the vechicle body, while in a central area the flexible flaps are provided with a cut without loss of material forming center segments projected towards the center and with rounded corners which allow passage between them, with their corresponding lateral displacement and thereby also of the flaps, of any tool in order to free the clip from the shank. The maximum size of the horizontal segments and therefore of the notch for attaching the clip is obtained by a bend of lateral sectors which form part of the clip itself, above the bend of the corresponding flexible flap, with these lateral sectors projecting inwards and ending in end extensions for support of the clip on the vehicle roof.

5 Claims, 10 Drawing Sheets

METALLO-PLASTIC CLIP FOR ATTACHING VEHICLE ROOFS AND ACCESSORIES TO THE BODY OF A VEHICLE

CROSS-REFERENCE TO RELATED APPLICATION

This application is a continuation of International Application PCT/ES00/00106 filed Mar. 24, 2000, which International Application was published by the International Bureau on Sep. 27, 2001.

BACKGROUND OF THE INVENTION

1. Field of the Invention

The invention relates to a means for attaching certain internal accessories of a vehicle to its body, with an intermediate panel or lining which makes up the roof and which acts as a self supporting element, which means consists of a metal clip suitably coupled to an opening provided for such purpose in the vehicle body, so that it may be removed, and a plastic shank of which is part of the accessory, which shank may be coupled to the clip forming a set which is securely attached to the vehicle body, with the intermediate lining or roof, and with the accessory which the shank is part of, on the inside of the vehicle.

2. Related Art

Spanish Invention Patent P 9700867 and its addition 9800689 describe a means for attaching accessories to a car's body using a suitable coupling between a metal clip attached to an opening provided in the car body and a shank which bears the accessory and designed to be attached to the clip, with an intermediate panel or lining of the vehicle roof, so that as the accessory is attached the corresponding area of the roof lining is also attached.

Said attachment means described in the aforementioned Spanish Invention Patent and its addition is characterised in that the clip is constructed as a body with two lateral parts and a flexible flap in each part, and collaterally a side sectors which extend into lower and end segments which converge slightly upwards and outwards, so that the flaps, at the level of a bend made in each one, are provided with a notch by which the clip is attached to the opening provided in the vehicle body, as the notch is engaged in the corresponding side edges of the opening, while the lateral extensions provide the support surface for the inner face of the vehicle roof or lining, as said roof must be interposed between the lateral extensions of the clip and a base of the shank which is coupled and retained by the clip.

In this structure of the clip and shank described in Spanish Invention Patent 9700865 and addition 9800689 there are parts and elements which must perform such functions as allowing the coupling, fitting and locking between the clip and the shank, as well as allow their detachment from each other, so that the size of the flexible flaps and therefore of the longitudinal notch which they have for attachment of the clip on the opening of the car body, is limited because between the side edges of the flaps and the sectors on whose lower segments run the side extensions there is a great separation in order to allow to place walls provided in the shank.

In addition, on order to detach the shank and clip in order to remove the accessory the shank must have an inner tubular structure through which a special tool may be inserted and the top edges o the clip separated, freeing the shank. In other words, this detachment cannot be achieved with any tool, requiring a special tool.

SUMMARY OF THE INVENTION

The object of the invention is to provide a clip with structural characteristics which allow to remove it from the shank without the need of special tools. A further object of the invention is to provide a shank obtained by injection together with the accessory, so that it is sturdy and with guides of a suitable size next to the corners, allowing the length of support of the resulting flexible flaps of the clip to be maximum, thus also providing a contact and guidance area on the shorter sides of the car body opening, all of this providing a maximum stability in assembly and coupling of the set.

The metallo-plastic clip object of the invention solves the above described problem by means of improvements made in both the clip and shank which not only provide a larger notch in the flexible flaps for attaching the clip to the body opening and allow the use of any tool to detach the clip and shank, but also provide greater stability to the set and a sturdy and reliable attachment.

More specifically, one of the improvements consists in that the side sectors of the flexible flaps instead of being bent at their bottom are bent at an intermediate level, above the bend of the flexible flaps, so that the bend of these side sectors projects inward and then after a further 90 degree bend project outward, forming lateral vertical extensions which join in at an angle with the end segments where the clip rests on the vehicle roof. This novel construction of the aforementioned parts gives rise firstly to horizontal supports at the level of the first bend of the side sectors, which supports are meant to be placed on corresponding surfaces provided for such purpose in the sides of the shank, and furthermore, allow the lower end segment of the flexible flaps to have a greater length and thereby a longer notch, which allows an improved attachment of the clip on the opening of the vehicle body.

A further improvement consists of the flexible flaps being provided with a cut without any material being lost, which determines on each flexible flap an inwardly projecting segment bent near its lower free end, from where it then diverges, so that the bends are left facing each other allowing the insertion between them of any expansion tool which separates the flexible flaps, as it naturally will act on the bends of these internal segments which are part of the aforementioned flaps, allowing detachment from the shank.

A further improvement, in this case made on the shank, consists in its structure comprising a bridge whose top part ends as a spindle, allowing insertion between the opposing ends provided for this purpose in the top part, so that between the sides of this tapering top part and the bridge are provided stirrups in which said top opposing edges insert, while on the side there are sockets with resting points for the horizontal surfaces which are supported on the vehicle body. Above these sockets are supports for the planes defined by the first bend of the side segments of the clip, as well as side recesses for placing the lateral and vertical projection of the side segments.

Additionally, said shank sockets are located as far as possible towards the ends of the opening of the vehicle body, and between its side supports and the supports for the clip side segments there are centering guides, also located as near as possible to the corners of said opening, in order to provide a great stability to the attachment means, as well as an anti-rotation effect with respect to the perpendicular axis of the opening.

BRIEF DESCRIPTION OF THE DRAWINGS

These and further characteristics of the invention will be more clearly understood in view of the accompanying drawings of a preferred embodiment, where for purposes of illustration only the following is shown.

DETAILED DESCRIPTION OF THE EXEMPLARY EMBODIMENTS

Figure 4:
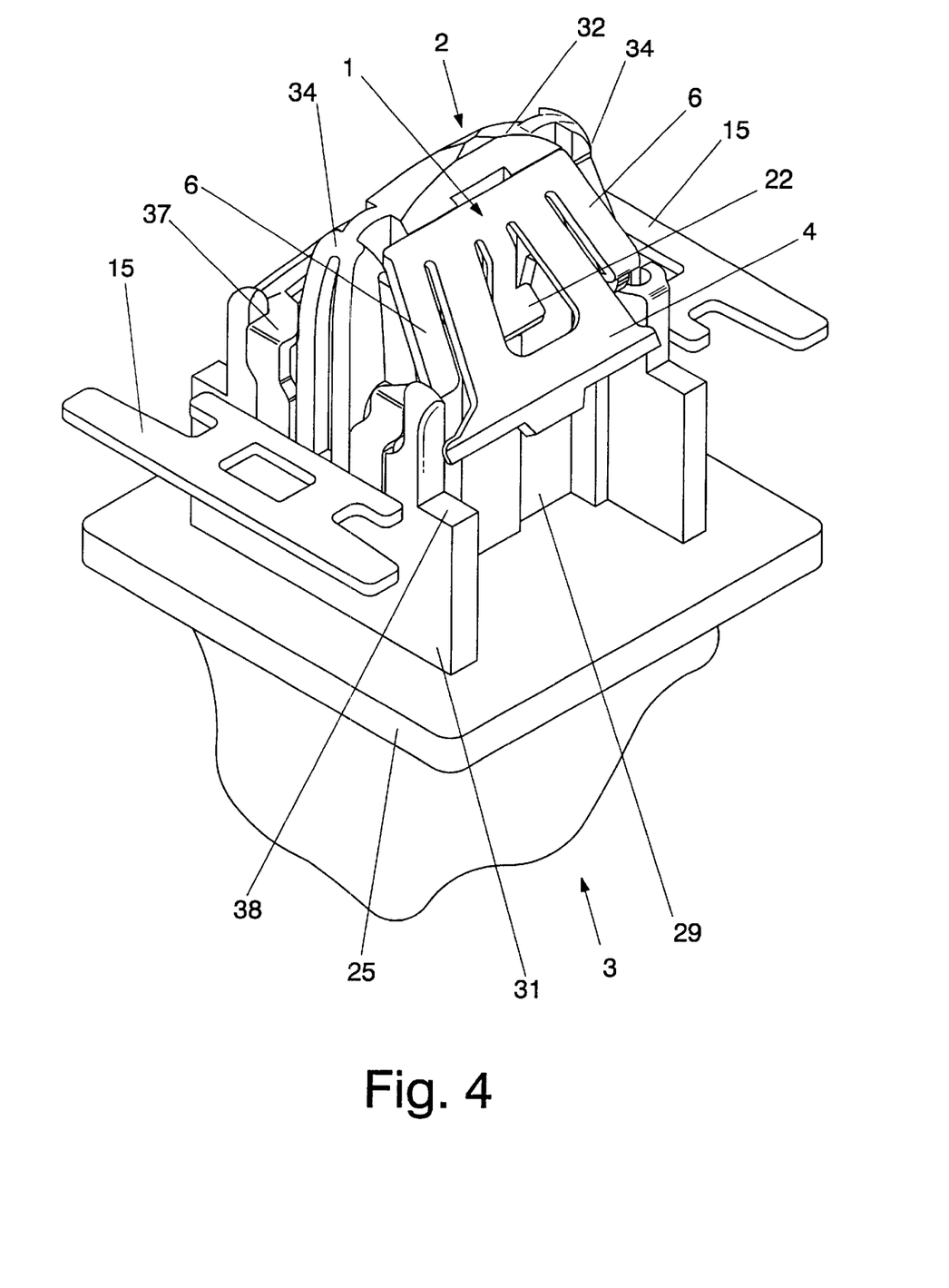
FIG. 4 shows a perspective view of the coupling between the clip and the shank of the previous figures.

As may be seen in the figures, the metallo-plastic clips for attaching roof vehicles and accessories to a vehicle body, comprising a clip 1 and a shank 2 of which is part the corresponding accessory 3, as seen in FIG. 4.

Figure 1:
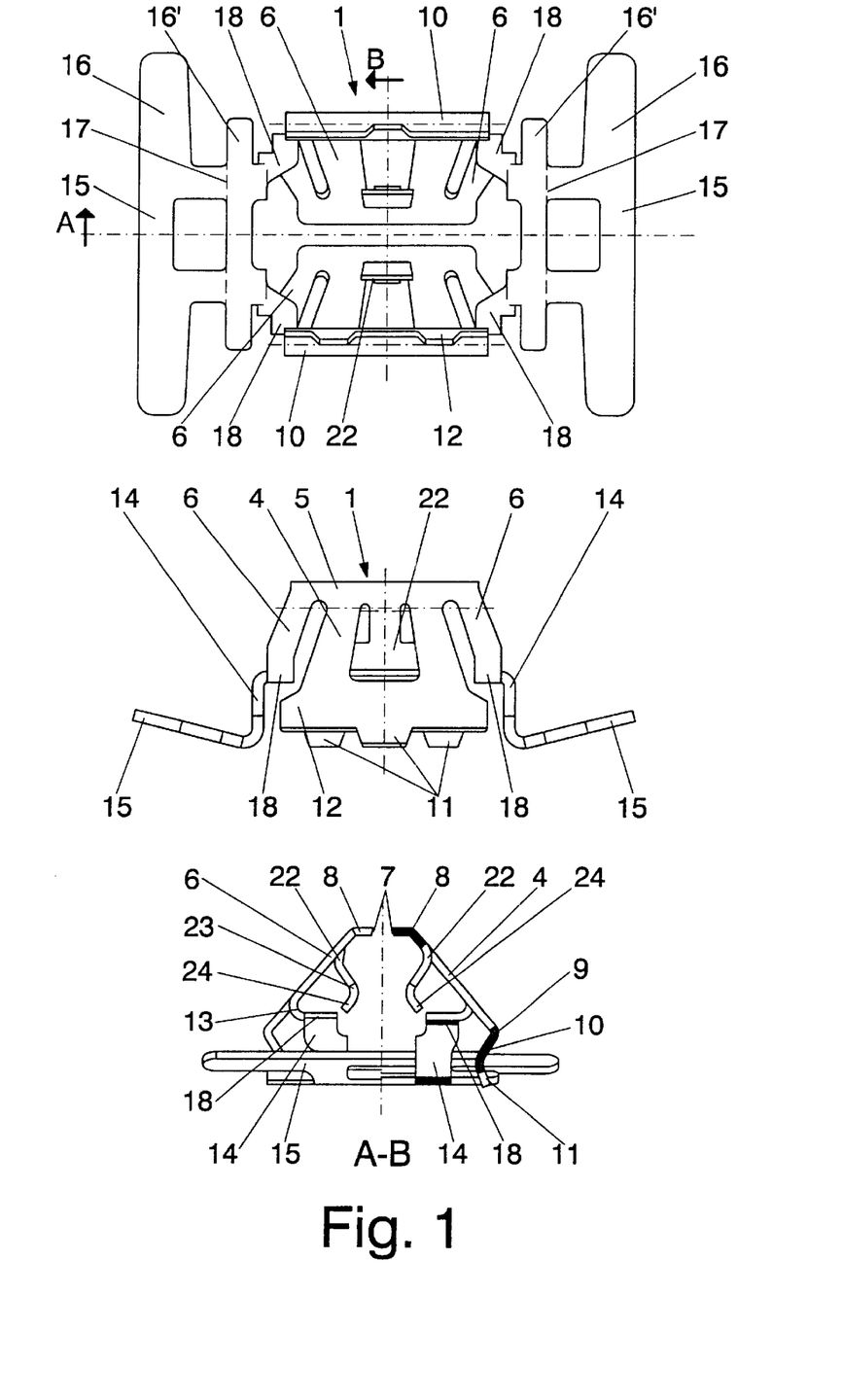
FIG. 1 shows a plan view, a front elevation view and a side elevation view along a semi-section of the clip which is the object of the invention.
Figure 2:
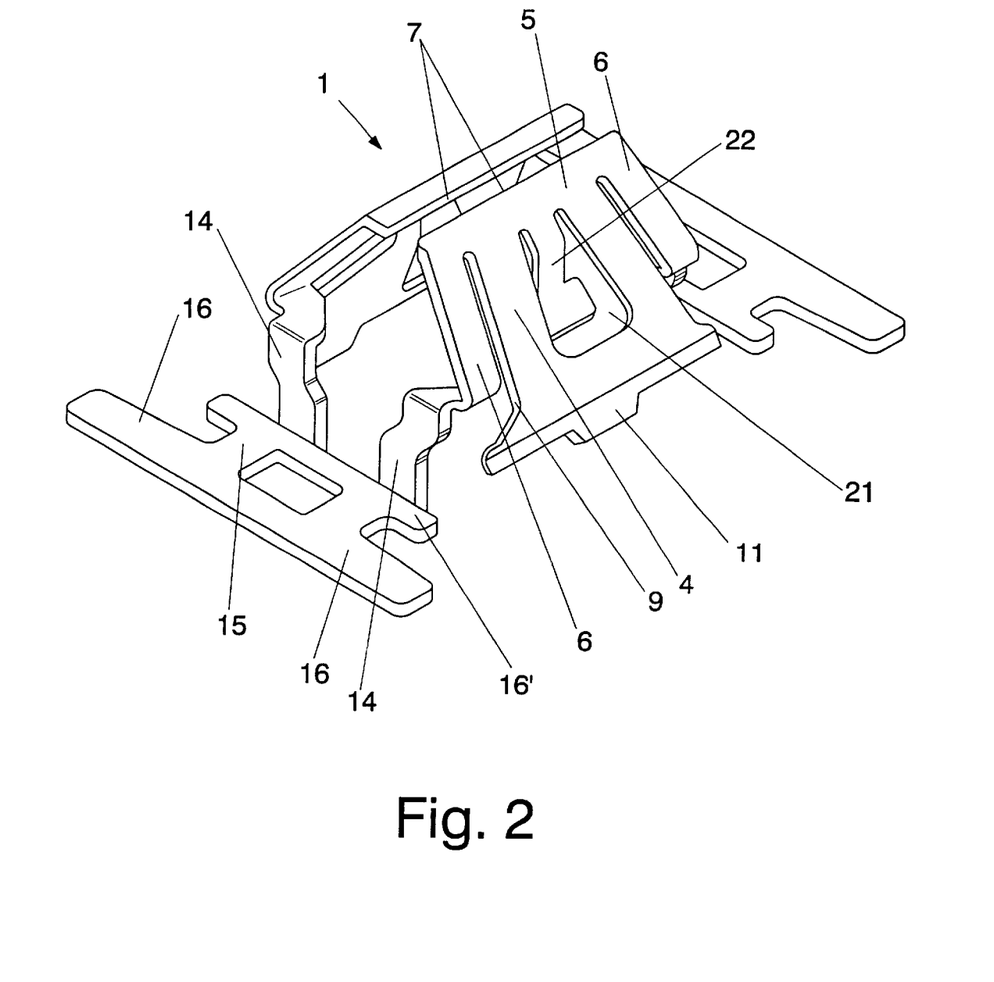
FIG. 2 shows a general perspective view of the clip shown in the previous figure.

Clip 1 comprises two lateral flexible flaps 4 with a mainly trapezoidal shape, although on the bottom it is rectangular, which flaps 4 are attached through an upper longitudinal band 5 to corresponding lateral sectors 6 with each clip provided with four lateral sectors 6. On the top bands 5 common to the flexible flaps and the lateral sectors 6 define opposing edges 7 which previously are provided with a rounded bend 8 as shown in FIGS. 1 and 2.

Figure 9:
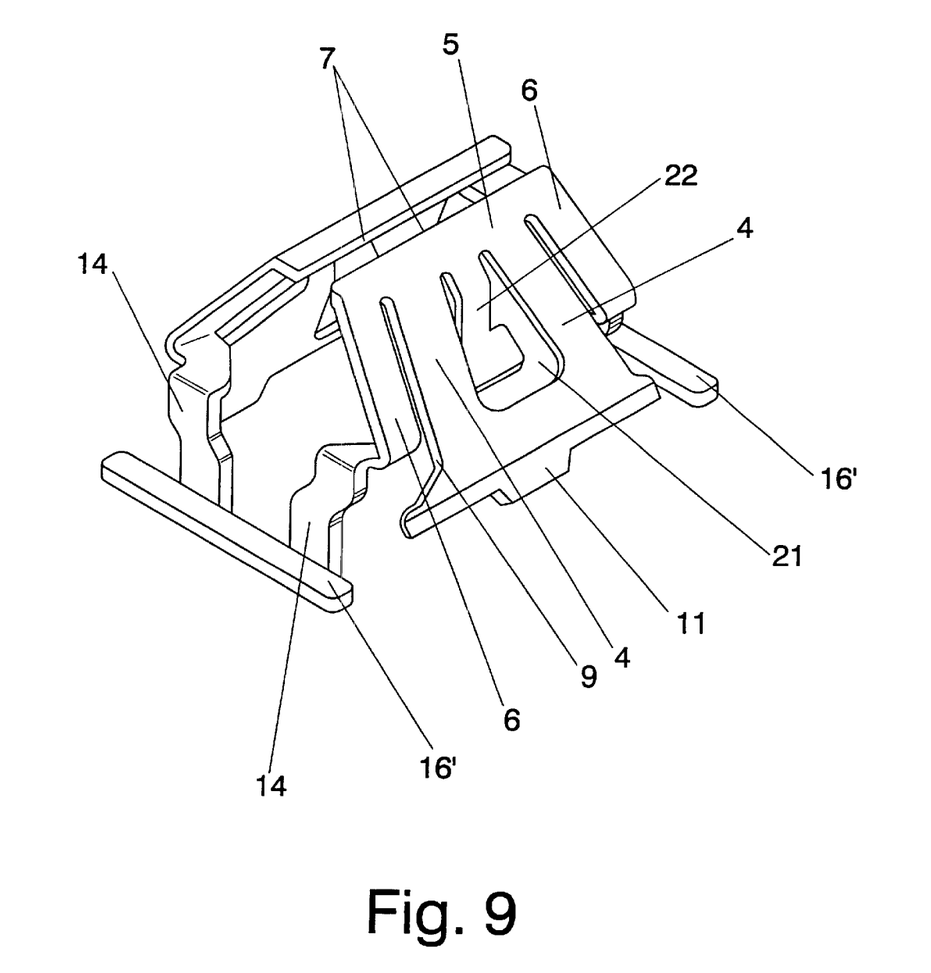
FIG. 9 shows a perspective view of the clip as in FIGS. 1 and 2 but with the end support segments shortened.
Figure 10:
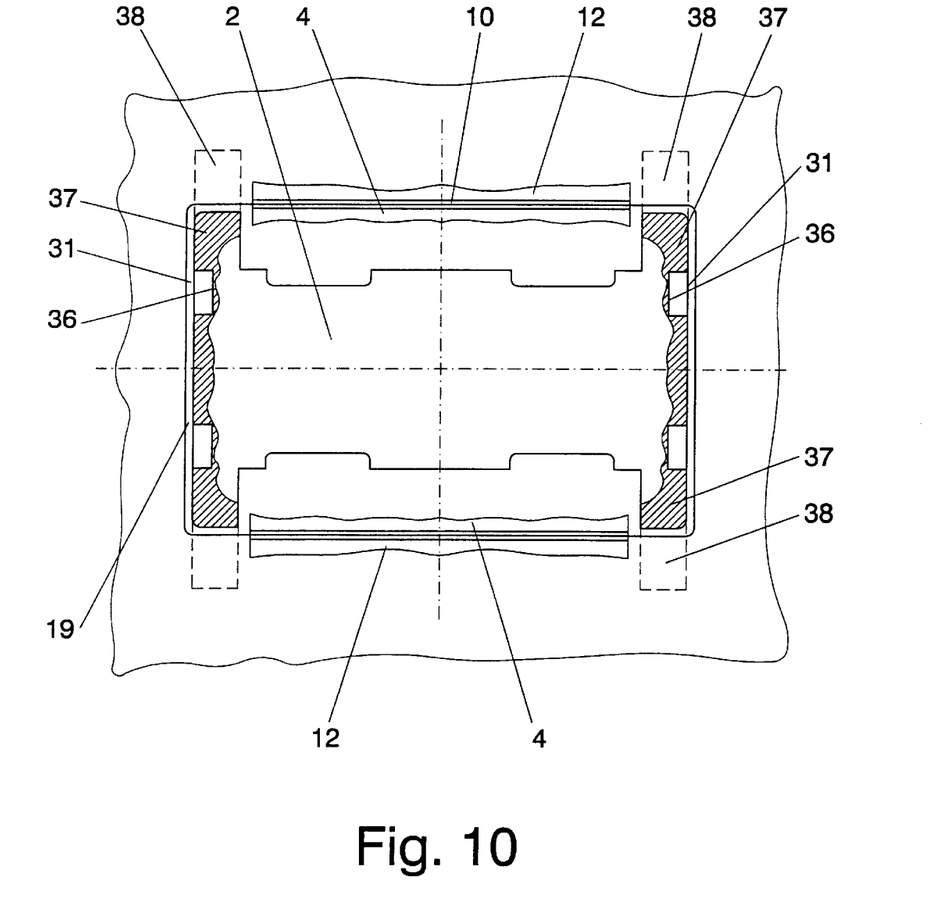
FIG. 10 shows a schematic plan view of the assembly of the set of clip and shank on the opening provided in the vehicle body, showing the contact areas and centering of the shank, and the long support surface of the clip notches on the edges of the opening.

Near their bottom edge, flexible flaps 4 are provided with a double bend 9 between which bends is defined a segment provided with a notch 10 and in correspondence with the bottom edge are provided tabs 11, two on one side and a single tab 11 on the other. After the first bend 9 of flexible flaps 4 the latter expand and define a rectangular segment 12 of a greater size above which are lateral sectors 6. Said rectangular segment 12 does not represent an obstacle for lateral sectors 6 as the latter have a first bend 13 above the plane of the start of bend 9 of flexible flaps 4, so that after said first bend 13 lateral sector 6 projects inwards to again bend in a right angle with respect to the prior one and project outwards, after which a vertical segment 14 extends downwards and separated from the ends of horizontal segment 12 corresponding to flexible flaps 4, so that said vertical segment 14 of each lateral sector 6 again bends on its bottom to define, together with that of the other lateral sector, end extensions 15 with projections 16–16' the first wider and longer, with an intermediate line 17 through which extensions 15 may be eliminated, remaining only the part of extension 15 bearing extensions 16' as shown in FIG. 9, where the clip is shortened, which may be of great use in certain applications.

Between the first bend 13 and the second of lateral sectors 6, horizontal support planes 18 are defined, the purpose of which will be described later.

As may have been observed, the fact that the bends of lateral sectors 6 begins at a greater height and that they are projected inwards and outwards allows the bottom rectangular segment 12 of flexible flaps 4 to attain a greater width, and thereby also notch 10 provided for insertion in opening 19 made for such purpose in the vehicle body 20, in order to obtain a better locking of clip 1 in opening 19 as said locking shall be determined by notch 10 of each flexible flap 4.

As may be seen in the figures, flexible flaps 4 of clip 1 diverge downwards from their top opposing ends 7, with lower tabs 11 also diverging and projecting outwards after the aforementioned bends 9.

These flexible flaps 4, in addition to the above described characteristics, are provided in a central area with a slit which defines an opening 21 with a preferably trapezoid shape, without loss of material, determining segments 22 which project inwards, with a shape such that after a bend 23 they end in a outwardly diverging segment 24, with bends 23 facing each other, the purpose of which shall be described later.

Figure 5:
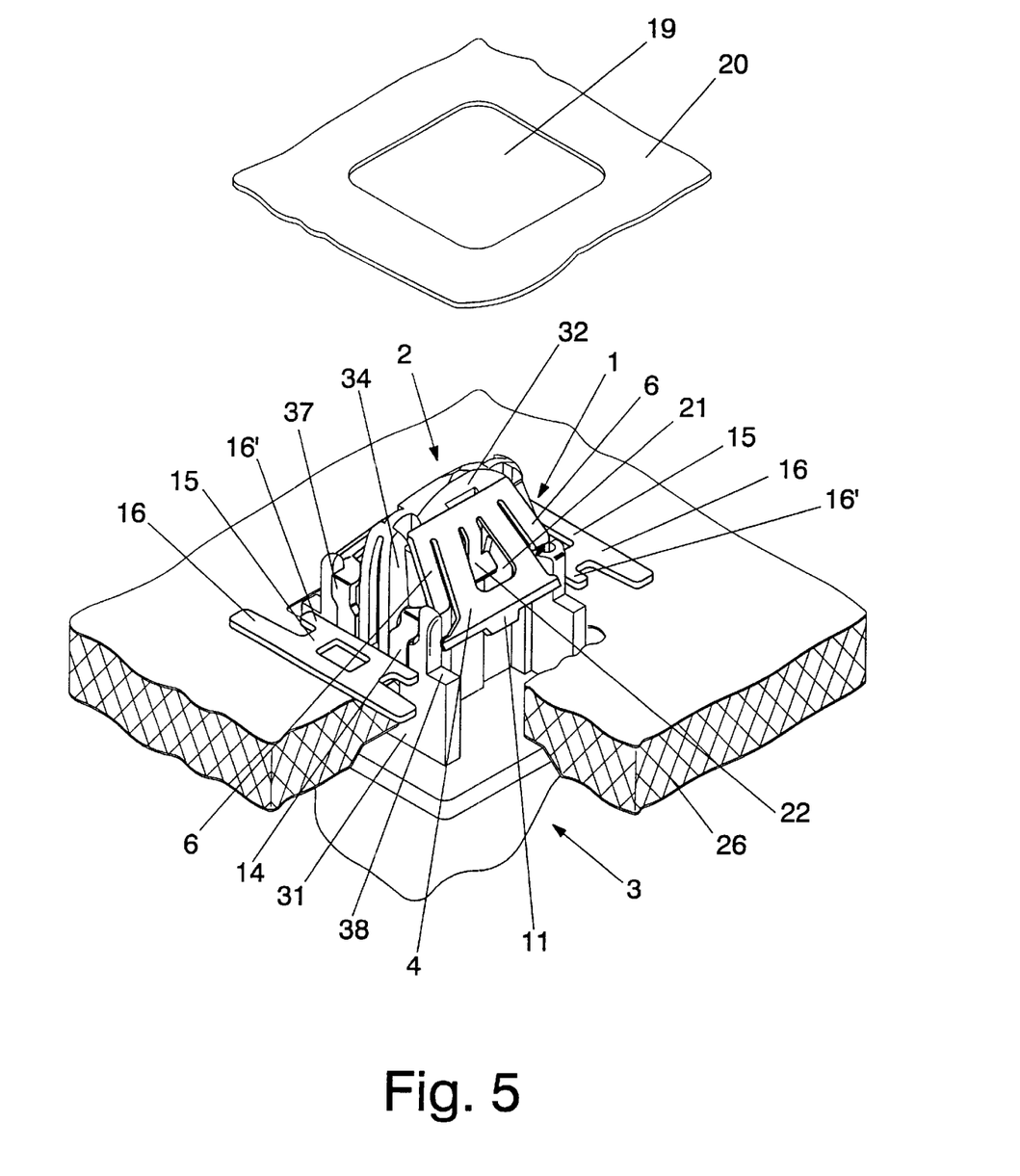
FIG. 5 shows the set shown in the previous FIG. mounted on the lining or roof of a vehicle, where said roof or lining acts as a self supporting element of the set, all to be assembled on the corresponding opening made for such purpose in the vehicle body.

As relates to shank 2, of which accessory 3 is a part, which is obtained from plastic by simultaneous injection of both elements, it includes a base 25 which upon mounting on the vehicle body is placed beneath the corresponding lining or roof 26, while on the latter's top surface are attached end extensions 15 with their extensions 16–16', as shown in FIG. 5.

Figure 3:
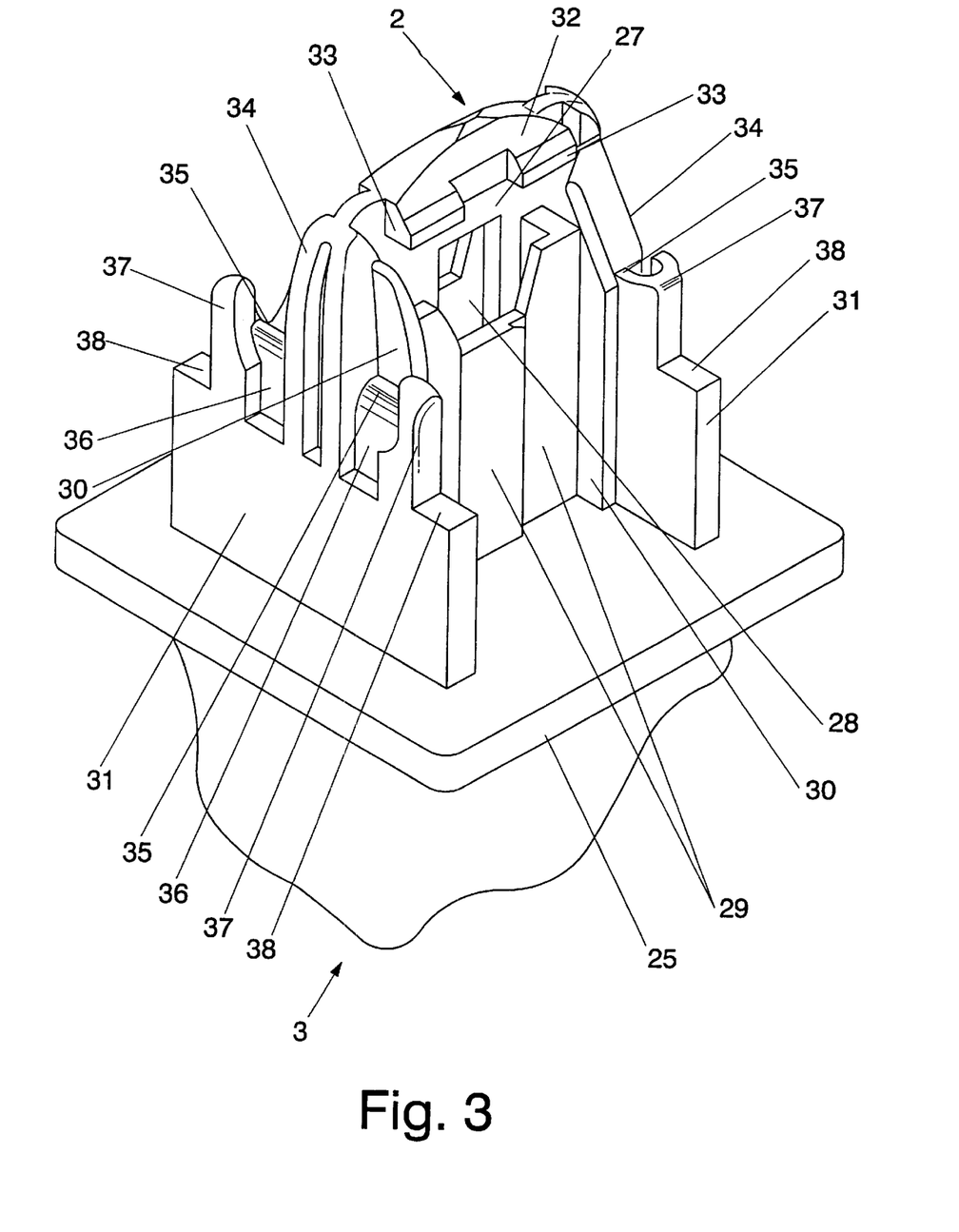
FIG. 3 shows a perspective view of the shank meant to insert in the clip shown in the previous FIGS., where the corresponding accessory is part of said shank.
Figure 6:
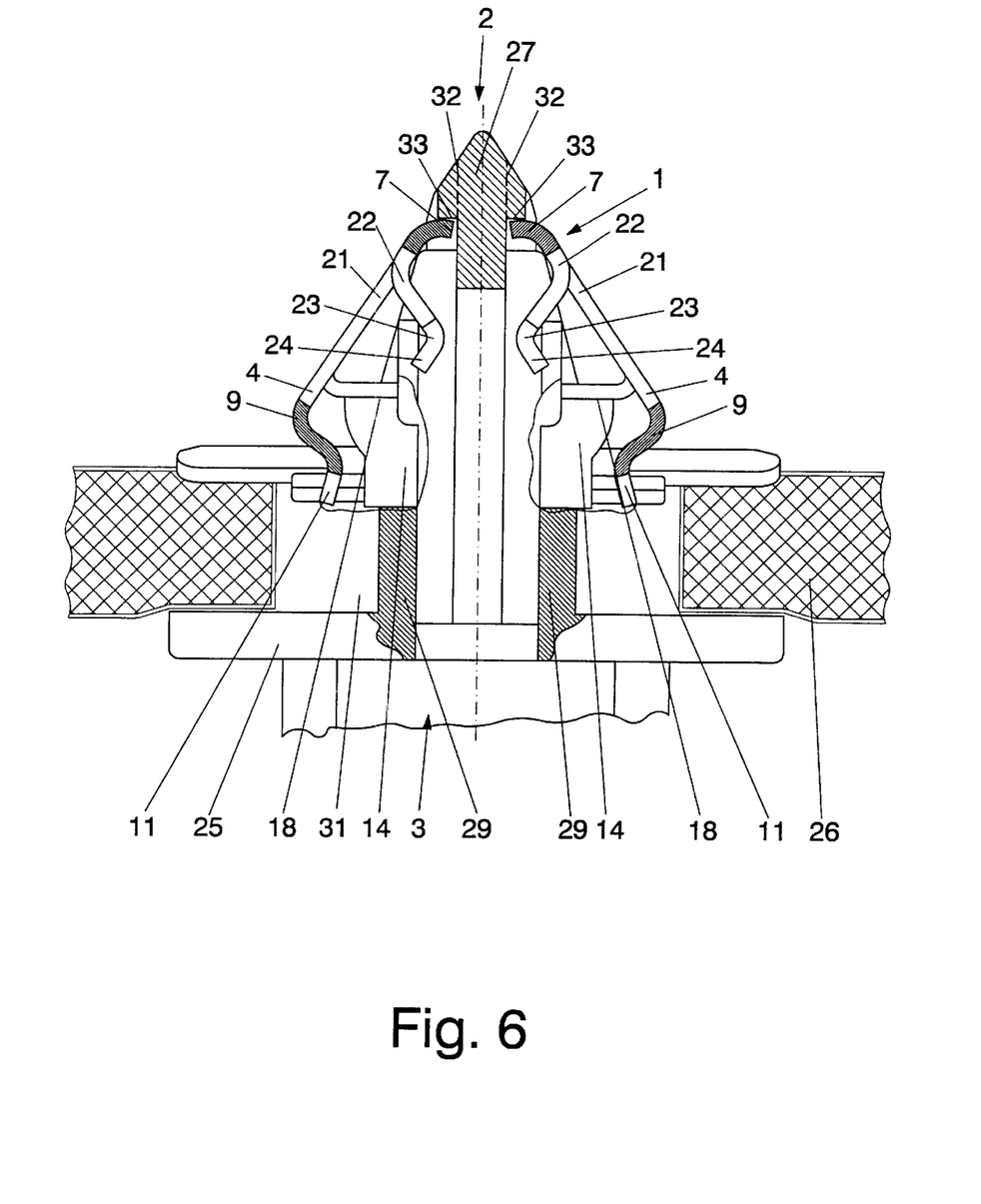
FIG. 6 shows a sectional view of the assembly set shown in the previous figure.
Figure 7:
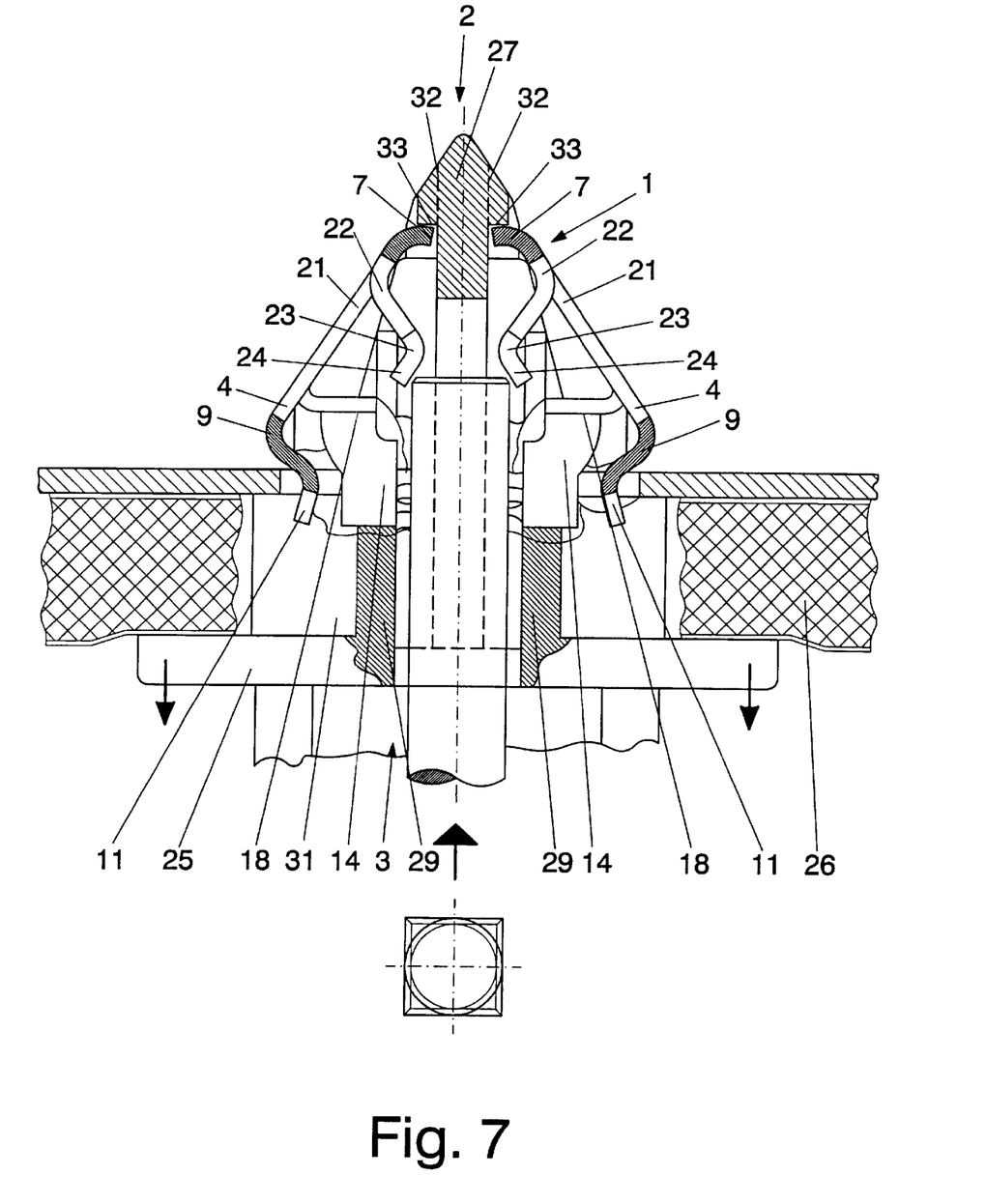
FIG. 7 shows a further sectional view similar to that of the previous FIG., showing an expansion tool in the insertion stage prior to being used to separate the flexible flaps which free the clip from the shank.
Figure 8:
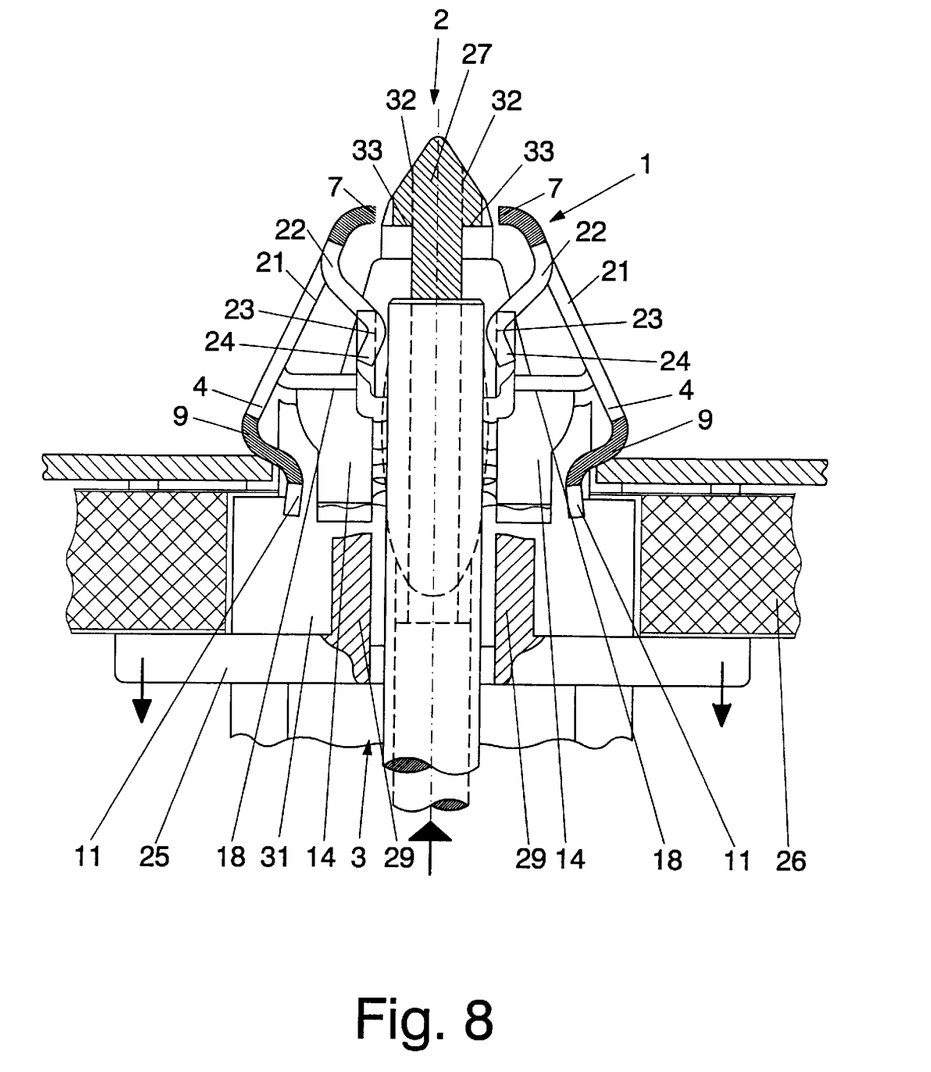
FIG. 8 shows a further sectional view similar to that of the previous FIG., with the expansion tool separating the flexible flaps and freeing the clip from the shank.

Said shank 2 comprises a bridge 27 under which is defined an opening 28, with walls 29 collateral to which are plates 30, and on the sides are sockets 31 as separated as possible, as shown in FIGS. 3 and 6.

The top of upper bridge 27 of shank 2 has a tapering shape 32 in order to aid in insertion of clip 1 when the latter's edges 7 slide on converging planes 32 which define said spindle-like shape, with aforementioned edges 7 locked under stirrups 33 made for such purpose in bridge 27.

In said shank 2 are defined lateral supports or columns 34 which act as guides for shank 2 as it is inserted, with walls provided with plates 30 and sockets 31, and supports 35 for support planes 18 of the clip 1, also shown in FIG. 3, opposite columns 34; on the top of sockets 31 are recesses 36 meant to house segments 14 which are extensions of lateral sectors 6 of clip 1. Additionally, in these columns or top part of their sockets 31 are defined centering guides 37 with the corresponding opening 19 for the vehicle body 20, further including four supports 38 in correspondence with the top edge of sockets 31 and whose support points 38 comprise the support means for the shank 2 on the vehicle body 20.

With the set placed on opening 19 of body 20 and clip 1 attached through notches 10 of flexible flaps 4 in the edges of said opening 19, in order to detach accessory 3 it is necessary to unlock clip 1 from shank 2, for which a tool 39 is inserted in opening 28 of shank 2, so that the end of this tool 39 eventually meets diverging segments 24 of the corresponding segments 22 of flexible flaps 4 of clip 1, so that by continuing to move said tool 39 upwards the segments 22 will be separated as their bend 23 is pressed, resulting in the flexible flaps separating and thereby the displacement of their edges 7 with respect to stirrups 33 of shank 2, releasing the latter and allowing to pull on it, thus detaching the accessory, all of this so that assembly takes place by simply pressing upwards with shank 2 and accessory 3 until it locks in clip 1, as shown in FIG. 6.

In order to release clip 1 it is enough to press together tabs 11 using pliers or any other suitable tool, freeing them from opening 19 of body 20.

One skilled in the art will appreciate that the present invention can be practiced by other than the described embodiments, which are presented here for purposes of illustration and not of limitation, and the present invention is limited only by the claims that follow.

I claim:

1. Metallo-plastic clip for attaching vehicle roofs and accessories to the body of a vehicle, comprising two units which may be coupled to each other, one of which is said metallo-plastic clip itself and the other a shank, the former attachable to an opening of a vehicle body through notches provided in flexible lateral flaps which are complemented by external, lateral sectors of the sides of said clip, and which said lateral sectors are joined continuously to end extensions for support on a corresponding roof under which will be placed an accessory, which forms part of said shank coupled to said clip, with the entire set locked in said opening of said vehicle body, characterised in that said lateral sectors provided on either side of said flexible lateral flaps of said clip have an initial bend at a position above that of a second bend of said flexible lateral flaps, from which second bend is defined a rectangular lower segment of maximum size, providing an also maximum size for said notch used to lock said clip in said opening of said vehicle body; with said flexible lateral flaps also provided with a trapezoidal cut without loss of material, defining corresponding segments projecting inwards and provided with a rounded bend after which appear diverging segments, allowing the use of a conventional tool to separate opposing edges of a top part of clip by which said shank is attached.

2. Metallo-plastic clip for attaching vehicle roofs and accessories to the body of a vehicle, as claimed in claim 1, characterised in that after said initial bend of said lateral sectors of said clip there is defined an inward projection, and after a 90 degree bend with respect to the inside there is an outward projection, with a further bend defining an external vertical segment which is separated from side edges of said rectangular lower segment with a larger flexible lateral flap, and with a horizontal surface defined between the initial bends of said lateral sector which rests on a corresponding support provided for such purpose in the side walls of said clip.

3. Metallo-plastic clip for attaching vehicle roofs and accessories to the body of a vehicle, as claimed in claim 1, characterised in that said shank comprises a bridge with a tapering top part defining two upwardly converging planes on which slide said opposing edges of said clip, with said shank provided with stirrups on which lock said opposing edges, thus attaching the clip and the shank.

4. Metallo-plastic clip for attaching vehicle roofs and accessories to the body of a vehicle, as claimed in claim 1, characterised in that side walls of said shank define a lower socket, as well as recesses for placing vertical segments which are extensions of said lateral sectors of said clip, and on whose side columns are similarly defined guides and supports for said shank on the vehicle body.

5. Metallo-plastic clip for attaching vehicle roofs and accessories to the body of a vehicle, as claimed in claim 4, characterised in that said shank is attached with said side columns and said sockets to a base from which the corresponding accessory projects, by means of walls complemented by plates.

\* \* \* \* \*